Dec. 1, 1970   H. S. BEST ET AL   3,544,410

GLASS STACKING MACHINE

Filed Nov. 17, 1967   7 Sheets-Sheet 1

INVENTORS
HOWARD S. BEST
GRAHAM H. MOSELY

BY Hughes, Rothwell, Mion, Zinn & Macpeak

ATTORNEYS

United States Patent Office 3,544,410
Patented Dec. 1, 1970

3,544,410
GLASS STACKING MACHINE
Howard S. Best, Horseheads, N.Y., and Graham H. Mosely, Raleigh, N.C., assignors to Corning Glass Works, Corning, N.Y., a corporation of New York
Filed Nov. 17, 1967, Ser. No. 684,006
Int. Cl. G05g 15/00
U.S. Cl. 156—351                     18 Claims

ABSTRACT OF THE DISCLOSURE

A machine for automatically and precisely stacking and laminating thin plates of glass from three separate magazines under a pre-programmed numerical control onto a pallet. The glass electrodes are stacked in magazines and a support table is horizontally movable in oppose directions relative to a pick-up head having a vertically movable pick-up bar with vacuum applied thereto. The pick-up bar includes a registration bar and a sensor for registering and aligning picked-up plates and by the relative movement of the table the pick-up bar moves over a vertically movable adhesive applying pad and then to a pallet to deposit the plate by release of vacuum. There is automatic pallet loading and unloading and a pallet conveyor for conveying loaded pallets from several identical heads to an unloading station. The entire machine is automatically controlled from the numerical control unit and interlocked with various limit switches.

BACKGROUND OF THE INVENTION

Field of the invention

This invention relates to a machine for automatically and precisely stacking glass plates of fragile material such as electrodes used to form a laminant to be used as the body of a capacitor.

PRIOR ART

Electrical capacitors are known and widely used which are formed from a stack of glass plates having electrodes thereon. One type of capacitor uses staggered or alternating electrodes and each electrode is silk screened onto a thin fragile elongated glass plate. The dimension control in the stacking of the electrodes is highly important as is alignment to the final desired capacitance and to reproducible values of capacitance. The thickness of the glass determines how many electrodes have to be placed in the stack to get the desired capacitance.

A known prior method of making capacitors by stacking glass plates having electrodes thereon was to pick up the glass by hand, align the electrodes and the glass by hand, apply a binder by hand, and continue to repeat the cycle until the stack reached the proper height. The obvious deficiencies of such a manual operation will be readily apparent. This machine provides for completely automating the previously manual operation under pre-programmed control to provide for automatic and selective glass pick-up, automatic alignment and application of binder and automatic stacking with precision on the pallets and further automatic loading and unloading of the pallets.

It was also known in the prior art to provide a capacitor building machine with a movable jig and vacuum pick-up bar in which the jig was hand movable over a number of stacks of capacitor plates, hand movable down to pick up a particular plate and then hand movable to a final stack. See U.S. Pat. 2,416,101. However, such a capacitor building machine is practically a completely manual operation and only provides a handling jig for a manual operator without eliminating the skill or tediousness of manually stacking the electrode plates.

SUMMARY OF THE INVENTION

This invention automates the previously manual or manually controlled jig operation of stacking and laminating thin plates of fragile materials such as glass supported electrodes used in a capacitor and in so doing includes a horizontal support table which is movable back and forth in opposite directions and magazine for different types of glass plates on the support table. A pick-up head positioned above the support table includes a vertically movable pick-up bar having vacuum applied thereto for movement down to pick up a plate from one of the magazines under the control of a pre-programmed drive. The picked-up plate on the pick-up bar is registered by a registration bar and the position of the pick-up bar prior to depositing the plate is controlled by a sensor bar. The plates are stacked one at a time, after an adhesive binder is applied thereto on a pallet aligned in a pallet holder. The entire operation is automatically controlled from the pre-programmed drive and control circuit.

DESCRIPTION OF PREFERRED EMBODIMENT

General assembly

Figure 1:
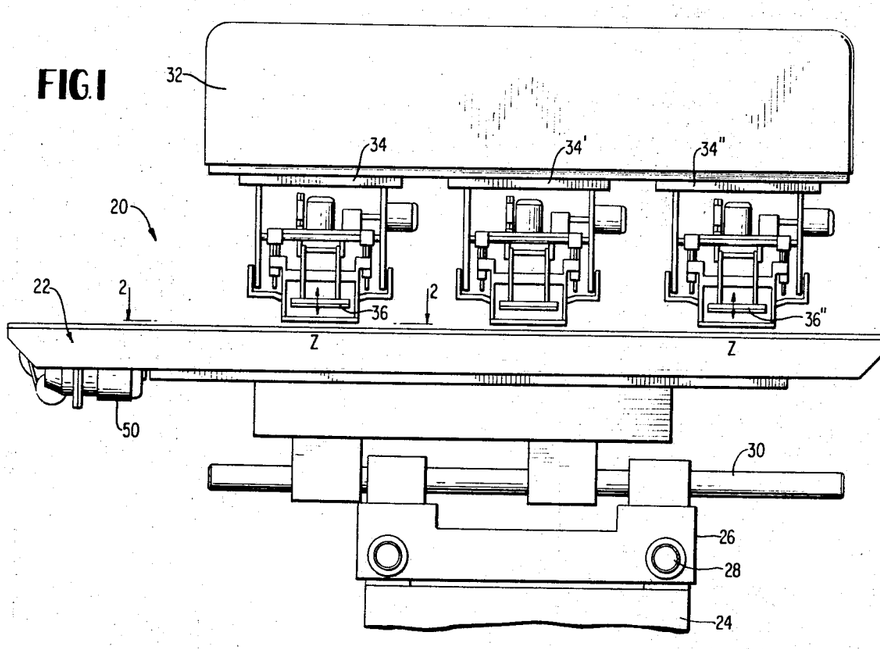
FIG. 1 is a side elevation view of the overall glass stacking machine of this invention.
Figure 2:
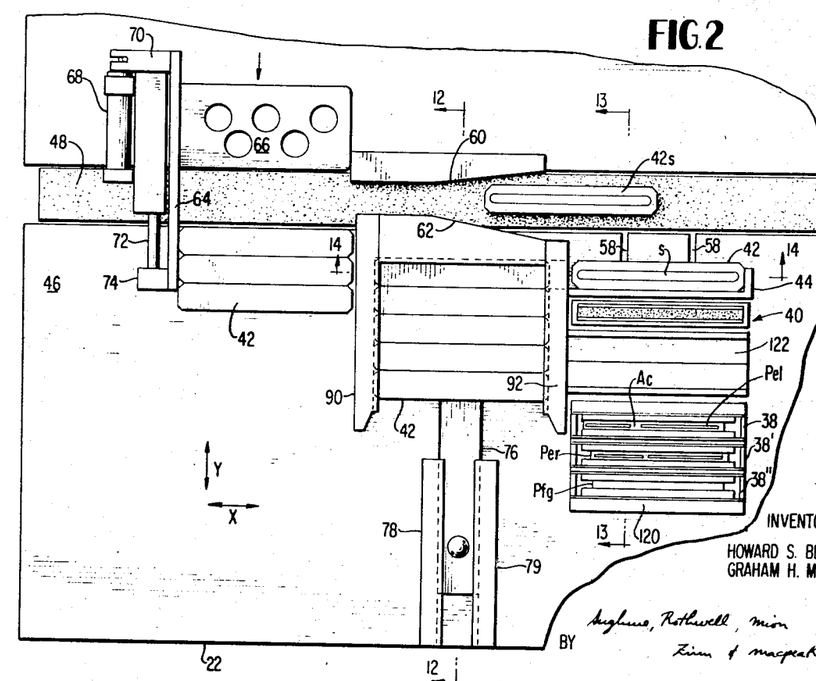
FIG. 2 is a plan view taken along line 2—2 of FIG. 1.
Figure 3:
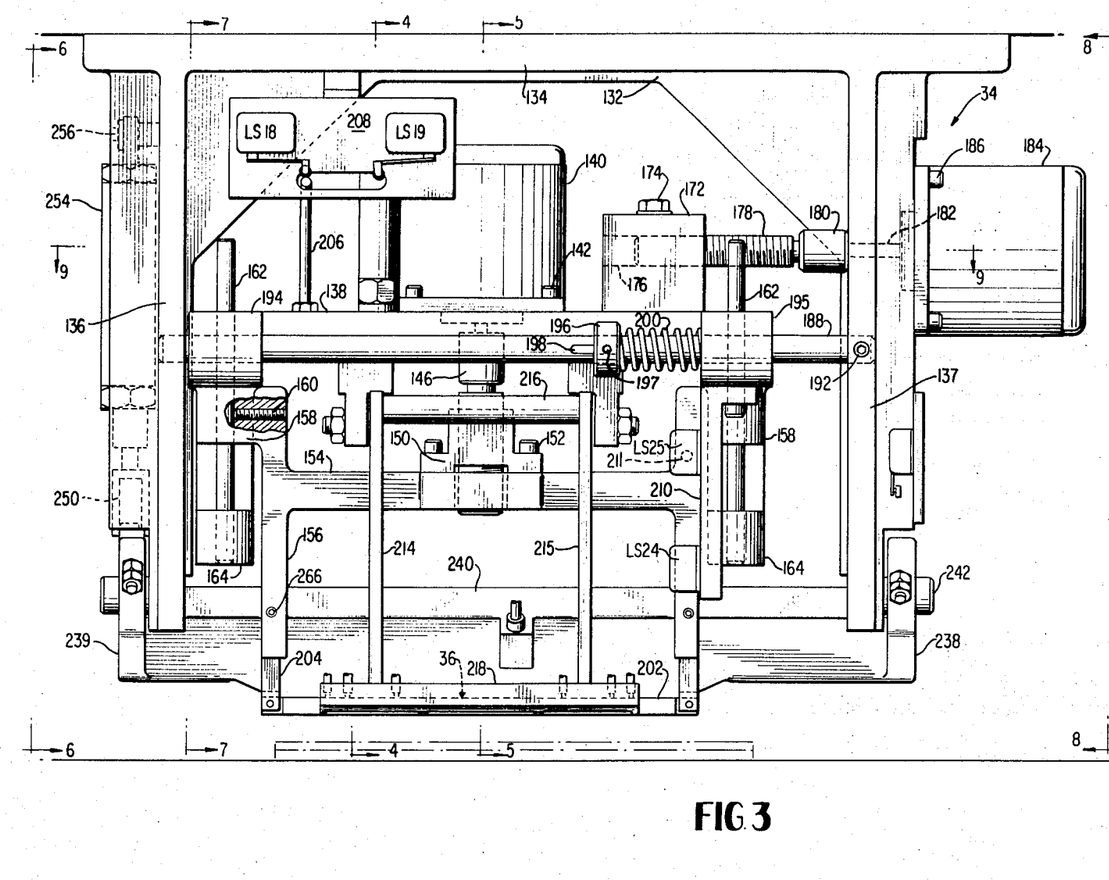
FIG. 3 is a side elevation view of a pick-up head.
Figure 4:
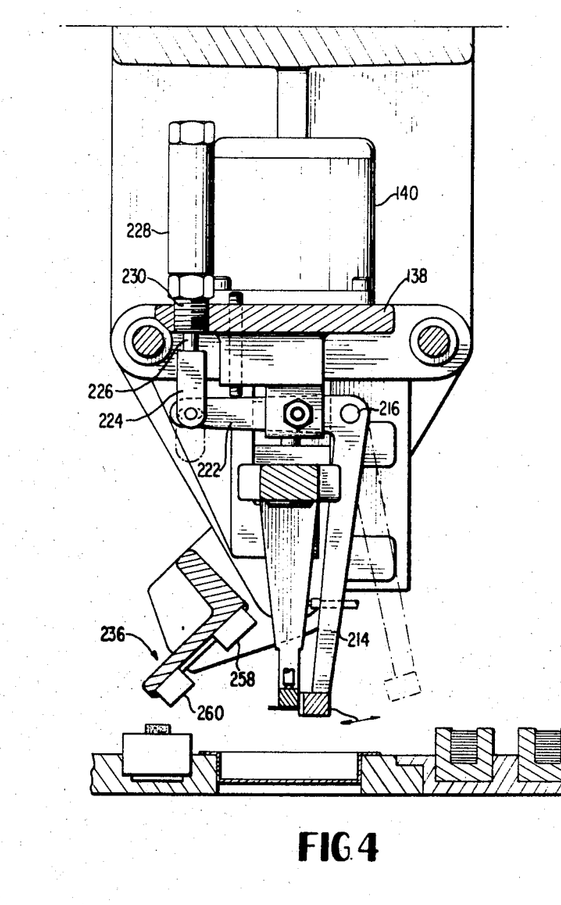
FIG. 4 is a sectional view taken along line 4—4 of FIG. 3.

Referring to FIG. 1, a glass stacking machine 20 includes a horizontal support table 22 which is movable under pre-programmed control from a numerical control unit back and forth in the direction of the double arrow Y in FIG. 2 on top of a stationary machine base 24. Intermediate base 26 is connected to the machine base 24 and the bottom of the table 22 through mutually perpendicular drive screws 28 and 30 and operation of the drive screw 28 allows the table 22 to be driven in the Y direction under the pre-programmed control relative to the stationary base. The table 22 may be initially adjusted in the X direction by means of the drive screw 30.

A stationary head 32 carries a number of pick-up head assemblies 34, 34' and 34". Since these pick-up head assemblies are identical, only one will be described. A pick-up bar 36 is carried by the pick-up head and is vertically movable with respect thereto in what will hereinafter be referred to as the Z direction, see FIG. 1.

Referring to FIG. 2 which shows a portion of the table 22 under one of the pick-up heads 34, there is shown a number of magazines 38, 38' and 38" positioned side by side on the table 22. Adjacent the magazines in the Y direction of movement of the table is a source of adhesive binder 40 and a pallet 42 which is positioned within a pallet holder 44 for receiving a stack S of different plates from the magazines 38, 38' and 38". For example, magazine 38 may have therein a stack of identical plates constituting a left electrode of a capacitor, P$el$. Magazine 38' may have plates which will constitute the right electrode of the capacitor, P$er$. Magazine 38" may have fragile glass plates which constitute the filler between the electrodes, P$gf$.

In the general assembly of this invention, a pre-programmed numerical control controls the drive of the table 22 in the Y directions to position pick-up bar 36 over a selected one of the magazines 38, 38' and 38". The numerical control commands the pick-up bar 36 to move vertically downward in a Z direction and vacuum applied to the pick-up bar picks up a plate from the particular magazine. The numerical control then commands the table 22 to move in the Y direction until the pick up bar is above the source of adhesive binder 40 at which time adhesive is applied to the bottom of the pick-up plate and held on the bottoms of the pick-up bar. The table 22 moves still further in the Y direction to position the pick-up bar above the pallet 42 in pallet holder 44 and then commands the pick-up bar to release the picked up plate so that it will drop onto the top of the stack S on the pallet 42. After a number of plates of varying, usually alternating, type are placed on the stack the numerical control unit commands the machine to remove pallet by moving pallet holder 44 and to insert a new empty pallet in a pallet holder. At the time the glass plate is picked up from the magazines, it is aligned using one flat elongated edge of the plate and one elongated edge of the pick-up bar 36. Furthermore, the electrode on the plate is placed in the desired reference position by a sensor arrangement which senses an alignment configuration Ac in the electrode. The three pick-up heads 34, 34' and 34" operate simultaneously and identically, unless there are problems in the pick-up cycle at which time one head will recycle until it catches up with the other two.

HORIZONTAL SUPPORT TABLE

The horizontal support table 22 is a rather large assembly and includes a top plate 46 having an opening extending therein to accommodate a belt conveyor 48 driven by a motor 50, see FIGS. 1 and 2.

For ejecting a pallet 42 having a stack S of glass plates thereon the L-shaped pallet holder 44 has arms 52 extending downwardly therefrom which are connected to a piston rod 54 of a cylinder 56 secured to the underside of the table assembly. On moving piston rod 54 to the right as viewed in FIG. 13, the pallet holder 44 will slide the pallet 42 onto the conveyor 48. To allow movement of the arms 52 in the table top plate 46, slots 58 are provided.

Belt conveyor 50 is continuously running and the pallets with the completed stacks piled up by the three heads 34, 34' and 34" are moved to the left as viewed in FIGS. 1 and 2 by the movement of the conveyor. The pallets are aligned with the path of travel of the conveyor by guide members 60 and 62 having narrowing entrance throats and the pallet with the stack 42S then is conveyed until it abuts a stop bar 64. A plate 66 is secured to stop bar 64 for movement transversely across the conveyor to slide the pallet 42S off onto the top of plate 46 where the stack may be picked off the pallet for further processing, or the pallet may be transferred with the stack. For moving the plate 66 there is provided a cylinder 68 having its piston rods connected to an extension 70 of the stop 64. A guide rod 72 slides in bushing post 74 so that on actuation of cylinder 68 the plate 66 may be moved across the path of the conveyor belt 48.

Figure 12:
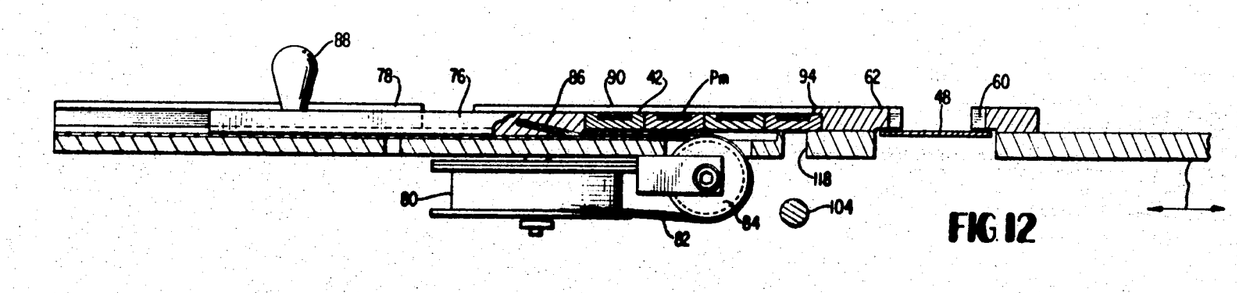
FIG. 12 is a sectional view taken along line 12—12 of FIG. 2.
Figures 14, 14A:
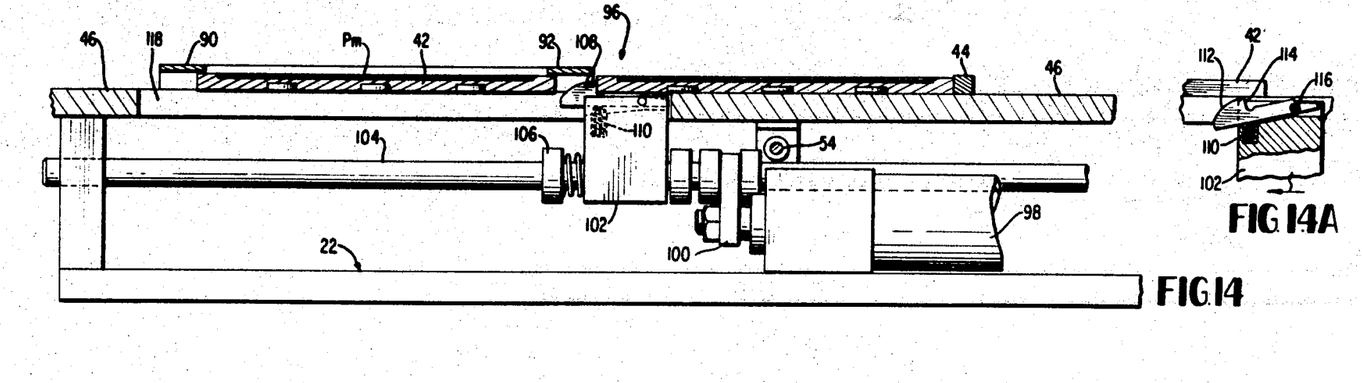
FIG. 14 is a sectional view taken along line 14—14 of FIG. 2.
FIG. 14A is a detailed view partly in section, of the catch mechanism of the pallet loading device.

For loading empty pallets 42 into the pallet holder 44 there is an arrangement shown particularly in FIGS. 12, 14 and 14A. The empty pallets 42 having a Mica plate P$m$ on their top surface are held in ready position by a spring biased slide 76 which is slidably guided by guide rails 78 and 79, see FIGS. 2 and 12. A spring device 80 with a cable extension 82 directed around pulley 84 has its free end 86 attached to the slide 76 and biases the slide to the right as viewed in FIG. 12. The end of the slide 76 abuts on the side of the pallets 42 and holds them in ready position. A handle 88 is provided on the slide 76 to retract the slide against the force of the spring to manually place more empty pallets 42 in ready position.

When the pallets are in ready position they are held under the edges of edge guides 90 and 92, see FIG. 2 and an overhang 94 on guide 62, see FIG. 12.

For injecting the innermost pallet in ready position into pallet loading position there is provided a pallet injector mechanism 96 best shown in FIG. 14. The pallet injector mechanism includes an actuating cylinder 98 attached to table 22 having a tie link 100 connected between its piston rod and a block 102 which is slidably mounted on a rod 104. A spring biased bumper 106 may be provided at one end of the block 102. The block 102 carries a catch 108 which is biased outwardly by spring 110. As shown in FIG. 14A, catch 108 has a curved outer surface for riding under a pallet 42 when the pallet is held down by the edge guides 90 and 92 and a straight surface 114 for catching the rear edge of a pallet 42 and moving it into pallet loading position against the L-shaped pallet holder 44 upon return movement of the block 102. The catch 108 is pivotally mounted on pivot pin 116 within block 102. As can be seen, when the piston within cylinder 98 moves to the left as viewed in FIGS. 14 and 14A, the catch 108 will pivot downwardly against the bias of spring 110, allow the block to move to the left until it is behind the pallet 42 in the innermost ready position. At a desired time on command from numerical control unit, the piston in cylinder 98 is moved to the right sliding block 110 to the right and causing catch surface 114 of catch 108 to slide pallet 42 into pallet loading position in engagement with the L-shaped pallet holder 44. In order to allow movement of the block 102 within top plate 46 there is provided a slot 118 in the table top plate.

Figure 13:
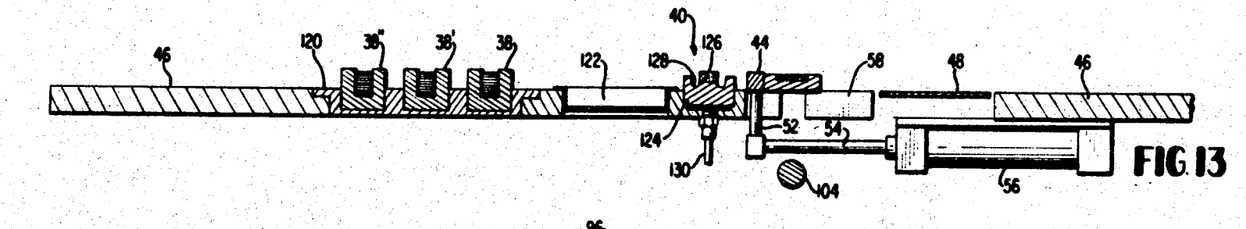
FIG. 13 is a sectional view taken along line 13—13 of FIG. 2.

Referring to FIG. 13, it can be seen that each of the magazines 38, 38' and 38" are positioned within a magazine rack insert 120 rigidly mounted within the table top 46 to establish a reference position for each of the magazines. Within a slotted table top 46 is mounted a broken glass plate tray 122 for receiving from the pick-up bar any pieces of broken glass picked up from the magazine.

The source of adhesive binder 40 includes an adhesive applicator block 124 which carries a capillary wick 126 for receiving adhesive binder carried in grooves 128 in the top surface of block 124. The block is mounted for vertical movement in the table top plate 46 and a fluid line 130 connected to a source of air pressure may be used to cause the block to move vertically upward and apply adhesive binder from the capillary wick 126 to the bottom of a plate P held on the bottom surface of the pick-up bar 36.

PICK-UP HEAD

The pick-up head 34 is shown in detail in FIG. 3–9. Each pick-up head assembly which is identical includes a frame 132 having a top member 134 which may be secured rigidly to the stationary head 32, FIG. 1. The frame also has side members 136 and 137 extending downwardly from the top member.

A central movable shelf 138 mounts a vertically disposed pick-up bar drive motor 140 by means of suitable screws 142. The shaft 144 of motor 140 extends vertically downward through shelf 138 and is connected through coupling 146 to a drive screw 148, see FIG. 5. Drive screw 148 cooperates with a drive nut 150 secured by screws 152 to a cross member 154 of an H-shaped pick-up bar frame 156. The tops of the legs of pick-up bar frame 156 include bosses 158 having set screws therein for securing the frame to slidable guide rods 162. It is noted that there are identical bosses and guide rods on both sides of the H-shaped pick-up bar frame 156.

The guide rods 162 are slidably mounted in the central movable shelf 138 and in a bushing boss 164 depending therefrom and supported by extension 170.

A transverse drive block 172 is secured to the central movable shelf 138 by screws 174. Drive block 172 has threaded hole 176 therein for cooperating with a transverse drive screw 178 connected by coupling 180 to shaft 182 of the horizontally mounted transverse drive motor 184. The transverse drive motor 184 is secured by suitable screws 186 to the side 137 of frame 132.

For guiding the central shelf 138 in lateral movement there are a pair of guide rods 188 and 190 secured between the side portions 136 and 137 of the frame 132 by suitable means such as screws 192. Bushing bosses 194 and 195 extending from the central shelf 138, see FIG. 9, are slidably mounted on the rods 188 and 190 and support the shelf for transverse movement.

A collar 196 surrounds guide rod 188 and set screw 197 therein cooperates with slot 198 to adjustably and non-rotatably mount collar 196 on rod 188. A spring 200 is located between bushing boss 195 and collar 196 to normally bias shelf 138 to the right and eliminate any backlash in the screw and nut drive.

A pick-up bar cross piece 202 is loosely connected to the bottom of legs 204 of the H-shaped pick-up bar frame 156.

Limit switches LS25 and LS24 attached to switch bracket 210 are positioned to be contacted by a switch actuator button 211 to indicate the up or down position of the pick-up bar. As can be seen from the foregoing energizing motor 140 drives the pick-up bar vertically up or down via drive screw 148, nut 150 and frame 156 which is guided by guide rods 162 sliding in bushings 164 and shelf 138. Transverse movement of the pick-up bar 36 is accomplished by energizing motor 184 and moving the shelf 138 bodily in a lateral or transverse direction via drive through screw 178 and block 172 while shelf 138 is guided on guide rods 188 and 190 by means of bushing bosses 194 and 195.

Limit switches LS18 and LS19 mounted on switch bracket 208 are contacted by actuator 206 extending upwardly from movable shelf 138 to provide a signal at the limits of transverse movement of the shelf 138.

A plate registration device 212 is carried by the movable shelf 138 for movement therewith and the plate registration device is also movable relative to the pick-up bar to align a picked-up plate via a long flat edge of the plate with corresponding lower edge of the pick-up bar.

The plate registration device 212 is composed of a pair of spaced apart levers 214 and 215 pivotally mounted on a pivot shaft 216. A registration cross bar 218 having a registration surface 220 connects the lower ends of the two levers 214 and 215 and is positioned at such a height that when the levers are pivoted about pivot shaft 216 the center of the registration surface 220 abuts the outer bottom edge of the pick-up bar cross piece 202, see FIGS. 4 and 5. End 222 of lever 214 is attached to a drive means which includes a yoke 224 connected to a piston rod 226 of a motor 228. The motor 228 is secured in shelf 138 by a screw connection 230. End 232 of lever 215 has an adjustable screw switch actuator 234 thereon for actuating limit switch LS9 and indicating that the registration surface 222 has tapped the cross piece 202 of the pick-up bar to align the picked-up plate P thereon. It is noted that the plate registration device 212 is carried from the shelf 138 and hence is moved transversely therewith. However, the registration bar doesn't move vertically downward when the pick-up bar 36 moves down to pick up a plate from one of the magazines.

A sensor bar 236 is carried by the frame 132 and is not movable either transversely or vertically up and down. The sensor bar 236 is, however, pivotally movable from a position shown in FIG. 4 to a sensing position shown in FIG. 5. While the sensor bar is in the sensing position shown in FIG. 5, motor 184 is energized to traverse the pick-up bar 36 until the sensor bar senses an alignment configuration Ac in the picked-up fragile glass plate P at which time the traversing of the pick-up bar stops and the pick-up bar will have its picked-up plate at a reference aligned position.

Figure 5:
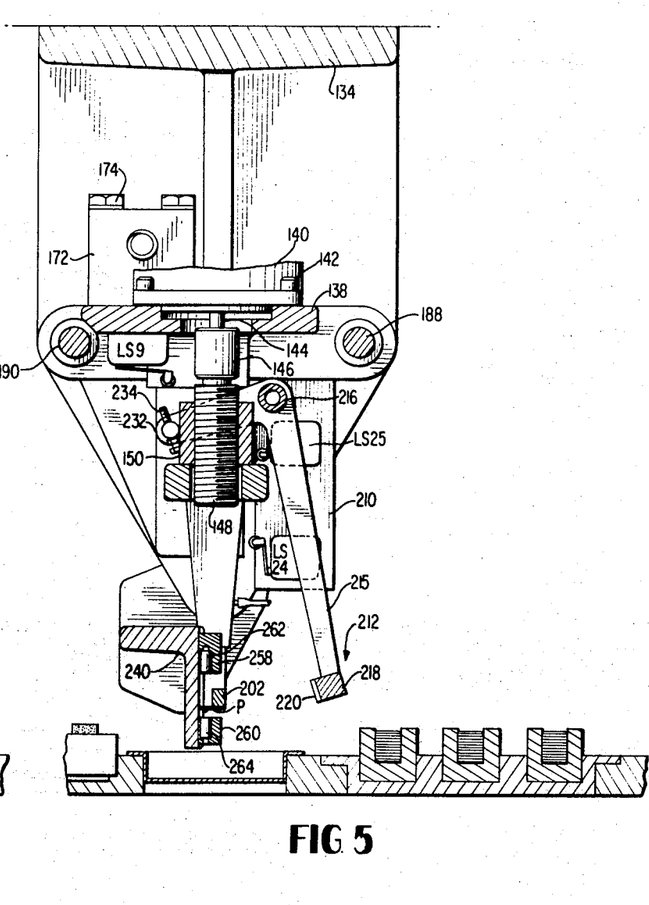
FIG. 5 is a sectional view taken along line 5—5 of FIG. 3.
Figure 6:
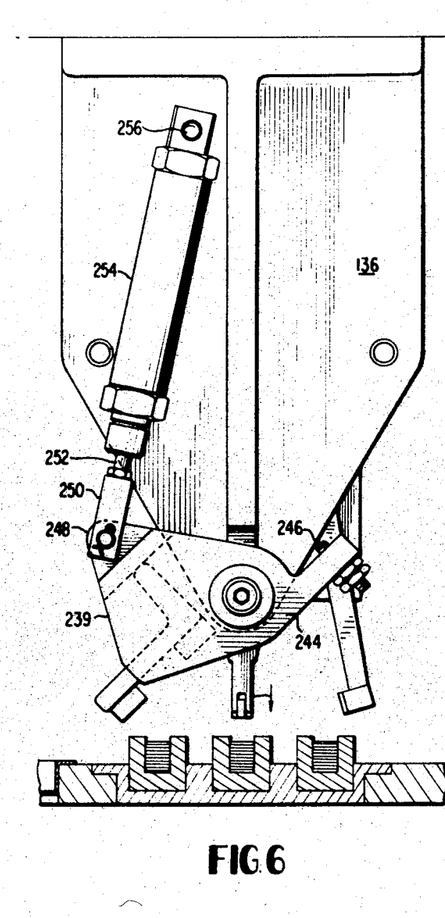
FIG. 6 is a sectional view taken along line 6—6 of FIG. 3.
Figure 7:
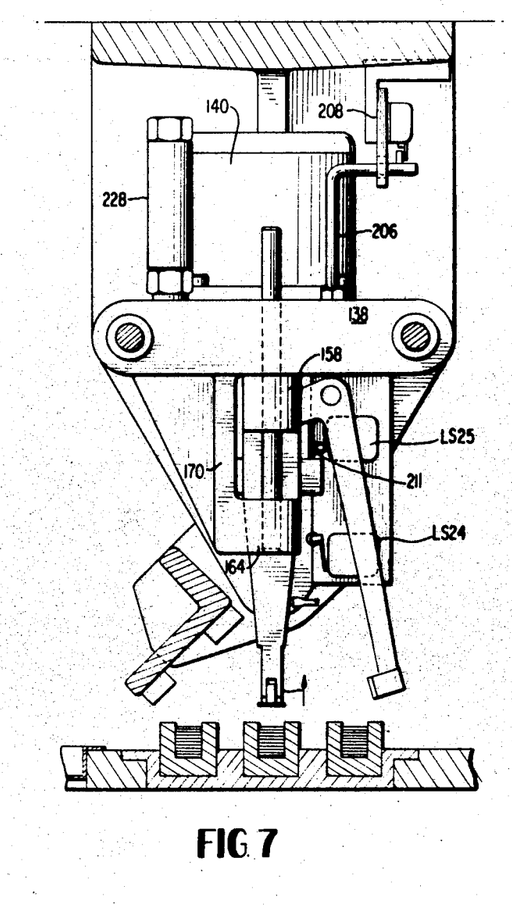
FIG. 7 is a sectional view taken along line 7—7 of FIG. 3.

The sensor bar 236 is formed of two end plates 238 and 239 and a connecting cross piece 240. The end plates are mounted on stub shafts 242 in depending side members 136 and 137 and each end plate includes an arm 244 mounting a screw adjustable stop 246 which abuts against a web of the corresponding end frame 136 or 137. Pivotal movement of end plate 238 actuates limit switches LS12 and LS13 to determine the particular position of the sensor cross bar 240. The end plate 239, FIG. 6, has an extension 248 which is connected to a yoke 250 of a piston rod 252 of cylinder 254. The cylinder is in turn attached by pivotal connection 256 to side 136 of the frame 132. Obviously, extending the piston rod 252 will cause the sensor bar 236 to pivot about stub shafts 242 and move from the position of FIG. 4 to the position of FIG. 5. Carried on the cross piece 240 of the sensor bar is a lamp unit 258 and a detector unit 260. The lamp unit may contain a lamp bulb 262 and the sensor may contain a suitable photo-responsive sensor 264. The lamp unit and sensors are positioned as shown in FIG. 5 when the sensor bar is in sensing position to align with the alignment configuration Ac on an electrode plate P$er$ or P$el$ which extends rearwardly of the cross piece 202 of the pick-up bar 36.

For determining whether or not the cross piece 202 of the pick-up bar 36 is adjacent a stack of glass there is provided an arrangement including an air inlet 266 in leg 204 of the pick-up bar frame 156, the air inlet connected through passage 268 to a bottom outlet 270. The cross piece 202 of the pickup bar has a slot 274 therein which cooperates with a pin 272 extending from the bottom of leg 204. When the pick-up bar is in its uppermost position shown in phantom lines in FIG. 10 the distance $a$ between the top of pick-up bar and the bottom of opening 270 is sufficiently small to operate a fluidic trigger circuit. When the weight of the pick-up bar ordinarily holds the cross piece 202 in the full line position shown in FIG. 10, the distance $b$ between the top of the pick-up bar cross piece and opening 270 is large enough to prevent operation of the trigger circuit.

Figures 8, 10, 11:
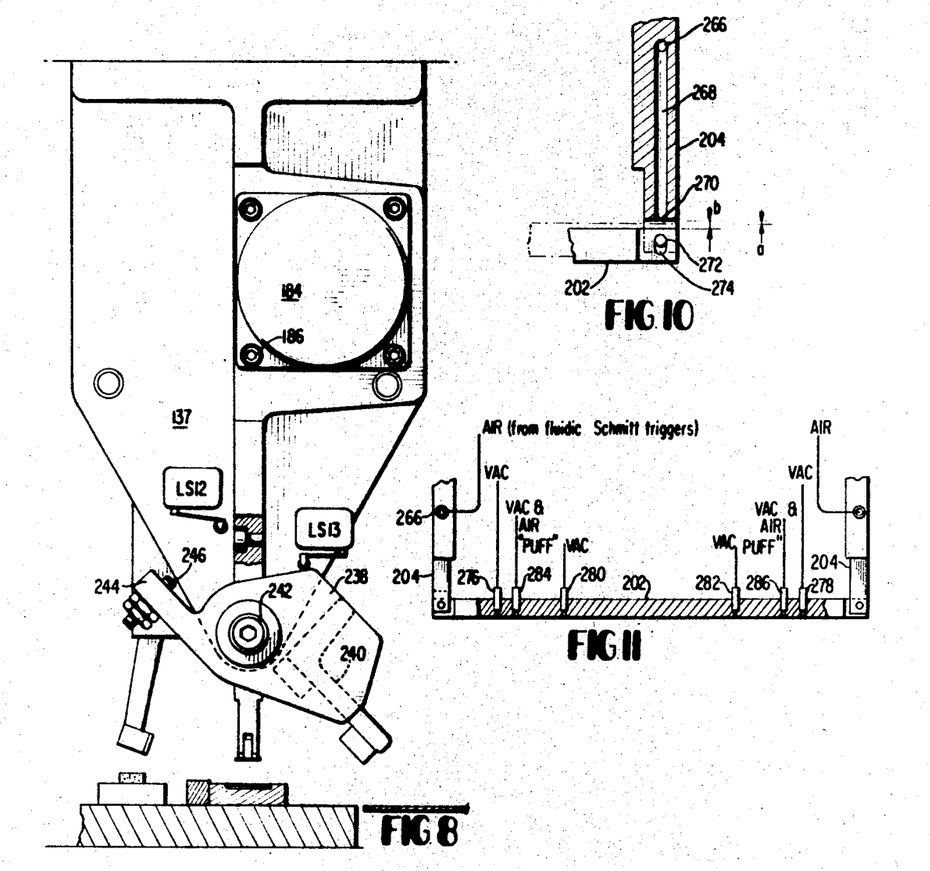
FIG. 8 is a sectional view taken along line 8—8 of FIG. 3.
FIG. 10 is a detailed sectional view of a portion of the pick-up bar assembly.
FIG. 11 is a schematic illustration of vacuum and air connections to the pick-up bar.
Figure 9:
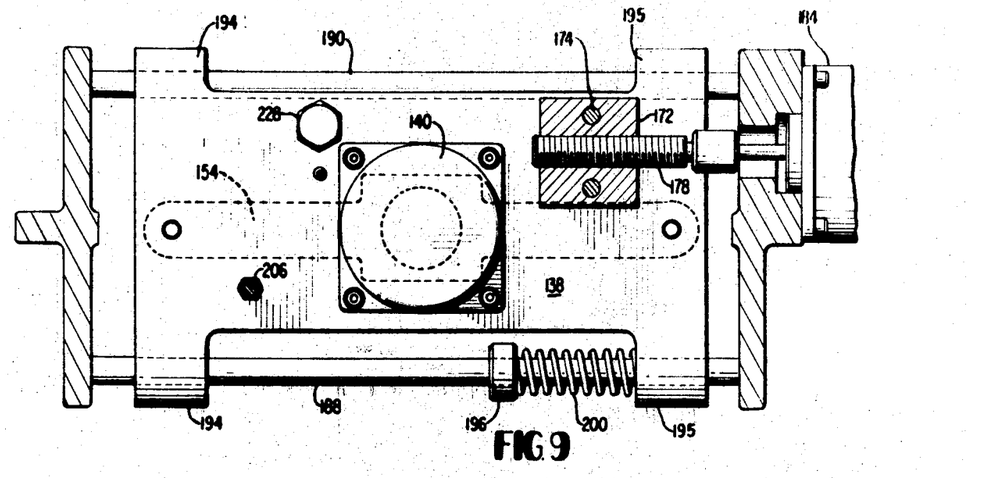
FIG. 9 is a sectional view taken along line 9—9 of FIG. 3.

FIG. 11 is a diagrammatic showing of the various air and vacuum connections to the pick-up bar cross piece 202. These include outer vacuum connections 276, and 278, inner vacuum connections 280 and 282, and intermediate connections 284 and 286 for both vacuum and air which may be applied as a puff to blow off glass at a desired time in the cycle.

OPERATION

Figure 15:
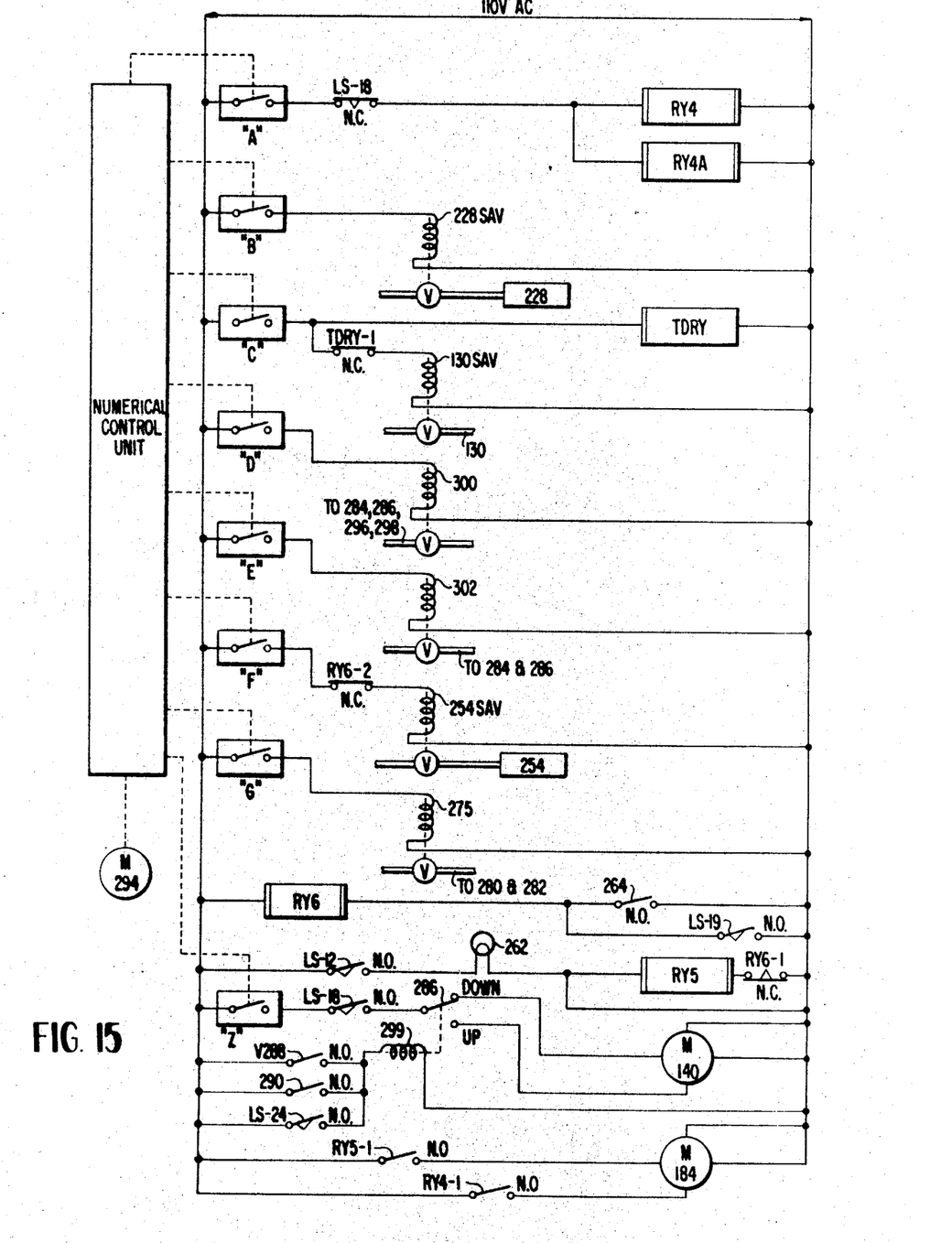
FIG. 15 is an electrical circuit diagram showing the control circuits for the machine.

The operation of the machine will now be described in connection with the partial electrical circuit diagram of FIG. 15 and the mechanical configuration and components previously described. FIG. 15 only shows the circuitry with respect to one head.

The numerical control unit which controls the functions of the machine may have a pre-programmed numerical control tape therein which steps to a new function after one function has been accomplished. The numerical control unit may be any one of a number of commerically available units such as that available from the Pratt and Whitney division of Colt's, Inc.

Assume that the glass stacking machine is in position with the pick-up bar 36 above the pallet 42 in stack position. A first block of information from the numerical control unit will call for a move of the table 22 in the Y direction by energization of motor 294 to a particular one of the magazines 38, 38′ or 38″ which has been selected for the first plate of glass to be used in the stack. This block of information also contains machine functions "A" and "G." Referring to FIG. 15, the A function will energize RY4 and RY4A. Energization of RY4 closes contacts RY4–1 applying power to the side moving motor 184 causing the pick-up bar to move to its side travel home position whereupon LS18 will be actuated. The pick-up bar 36 cannot go down until it is in its home position. The "G" function operates a vacuum control solenoid 275 which applies a vacuum to the holes 280, 282 in the pick-up cross piece 202. Energization of RY4A sends a hold signal to the tape control in the numerical control unit.

When LS18 is actuated RY4 and RY4A are de-energized thereby de-energizing motor 184.

When the table 22 reaches its called for position over a selected magazine the numerical control tape is automatically indexed to the next block which contains information for a move in the Z direction. This includes a "G" function to maintain vacuum at parts 280 and 282.

When the side travel motor 184 has moved the shelf 138 and the glass pick-up bar 36 to its home position, switch LS18 opens stopping the side travel motor 184 as mentioned above and also allows vertical movement of pick-up bar 36 by closing the circuit leading to the vertical travel motor 140. Controlling switch 286 for motor 140 is normally in the "down" position and on receiving a "Z" function from the numerical control unit the motor 140 is energized and bar 36 starts vertically downward into the magazine over which bar 36 has been positioned to pick up the top plate of glass from that magazine. There are three switches that will stop the pick-up bar 36 as it travels into the magazine and automatically reverse motor 140. The first is a glass pick-up sensor switch which is vacuum sensitive and connected to vacuum lines 280 and 282. This switch, V288, is connected to electromagnetic coil 299 to shift switch 286 to the "up" position to cause reversing of motor 140 when the glass bar is picked up. A collision sensor switch 290 located in the air pressure line leading through air inlets 266 in legs 204 connected to the pick-up bar cross piece 202 operates on air pressure connected through a fluidic Schmidt trigger and also causes shifting of the motor control switch 286 on the collision of the pick-up bar with the magazine or when the pick-up bar is on top of the glass. There is also LS24 which is a down travel limit switch indicating whether or not the magazine is empty. This switch is normally open, but if the magazine is empty it would be closed to reverse the down movement of motor 140 by shifting switch 286 to "up".

When all the glass pick-up bars 36 reach their home positions, as indicated by operation of LS25, the numerical control unit will advance its tape to put another block of information into the machine.

The next block of information contains information calling for table 22 not to move, i.e. no command for motor 294, a B function, and a G function. The B function causes registration of the glass plate on the bottom of the bar by causing the registration bar 212 to pivot about its axis 216 from the position shown in FIG. 5 to the position shown in FIG. 4 through the energization of solenoid air valve 228 SAV to apply air to cylinder 228. During registration the glass plate P will slide on bar 36 which is lightly held by vacuum ports 280 and 282 so that one long edge thereof is parallel and adjacent to a long lower edge of the cross piece 202. Also upon registration the switch actuator screw 234 will operate LS9 which will apply a signal to the numerical control unit clearing function "B" and causing the tape to advance and read in a new block of information.

This new block of information contains a "D" function applying vacuum to ports 276, 278, 284 and 286 to firmly hold the plate onto bar 36 and a signal for a Y move, i.e. a signal for motor 294 to drive the table in the Y direction to a predetermined sense position over reject tray 122. The G function is also present which means that the vacuum solenoid 275 is energized and vacuum is still applied to the end holes 280, 282 of the pick-up bar cross piece 202. When the table 22 is moved to the sense position over the reject collection tray, FIG. 5, a new block of information is read from the numerical control unit.

This next block of information does not contain a Y move, i.e. motor 294 is not energized but does contain an F function to cause the sensor bar to pivot. The F function energizes the sensor bar air valve solenoid 254 SAV which applies air to cylinder 254 and causes the sensor bar 236 to pivot from the FIG. 4 position downward into the sensing position shown in FIG. 5. When the sensor bar 236 reaches its sensing position shown in FIG. 5, LS12 is actuated which energizes light source 262. The operation of LS 12 also operates a relay RY 5 which closes control RY 5–1 to start motor 184 causing the glass pick-up bar to traverse from its home position. As the pick-up bar moves the glass is carried with it between the light 262 and light sensor 264 until the alignment configuration Ac passes between the light 262 and light sensor 264. The light sensor (through a pre-amplifier, not shown) operates logic controlled relay RY 6 which opens contact RY 6–1 which turns off the motor 184 by de-energizing relay RY 5. Resetting the F function by opening RY 6–2 allows motor 254 to return the sensor bar 236 to its home position shown in FIG. 4.

The three heads are inter-connected in circuitry not shown so as to remain stationary until all sensor bars 236 return to the up position upon sensing an alignment configuration or upon actuation of limit switch LS 19. When the sensor bars are returned to their home position, they actuate LS 18 which is their home position switch to close it. If all the vacuum holes are covered and LS19 is not actuated in any head, the actaution of all switches LS 18 operates a tape advance to insert a new block of information containing an "A" funtcion to operate motor 184 and return the pick-up bar 36 to home position.

Should one or more of the vacuum holes on the glass pick-up bars not be covered, the tape will not advance. Instead a glass blow-off signal will be initiated and a puff of air will be applied to air connections 284 and 286 in the pick-up bar cross piece 202 to deposit the glass in the reject tray. The tape will rewind and read the first block of information again so that the machine will start the cycle over again since it would not have picked up a good piece of glass.

In the machine where there are three heads, only one of the heads will recycle while the other two heads will be latched up waiting for the recycled head to catch up.

The next block of information (number 5) contains a Y movement to cause motor 294 to move the table to position the table in binder applying position above the binder applicator source 40. When the machine reaches the binder position, the tape advances again and a new block of information is read in.

This next block of information does not have a Y or Z move but does have a C funtcion which applies voltage to a time delay relay TDRY and to air valve solenoid 130 SAV which applies air to the bottom of binder applicator block 124 moving it upwardly against the glass that is on the bottom of the pick-up bar. After a set time tthe time delay relay will open switch TDRY–1 and the circuit to the binder air valve solenoid 130 SAV will open causing the binder applicator block 124 to drop back to its home position. The tape is again advanced in a numerical control unit to feed a new block of information and reset the C function.

The next block of information contains only a Y move which causes the motor 294 to drive the table to the stack position wherein the pick-up bar 36 is above the pallet 42. When the table reaches the stack position and is set, the machine advances the tape and a new block of information is read.

This next block of information has a "Z" function only causing the glass pick-up bar 36 to move downward onto the stacking pallet. When the bars have reached their stack position, the machine will set and advance the tape to a new block of information.

This next block of information contains a "Z" function, a "D" function, a "G" function and an "E" function. The "G" function turns off vacuum to ports 280 and 282. The "D" function de-energizes the vacuum control valve 300, turns off the vacuum to ports 276, 278, 284 and 286 and the 'E" operates solenoid valve 302 to apply a small amount of air which through connections 284 and 286 which blows the glass from the pick-up bar. The "Z" function moves the glass pick-up bar to its up position since switch 290 has been actuated causing motor 140 to reverse.

Thus, one cycle of operation is complete.

After a stack is loaded on the pallet, the machine function from the numerical control unit causes actuation of the air valve for the pallet unload cylinder 56. After the pallet is unloaded a limit switch (not shown) is actuated to control the pallet inject cylinder 98 after the pallet holder 44 has returned to its home position from its eject operation.

For operation of the belt unloader, a proximity sensor relay is utilized which senses the proximity of a loaded pallet and energizes cylinder 68. As the cylinder reaches its limit of travel, a switch is operated and an air valve solenoid is de-energized causing the air cylinder to return to its home position.

While the invention has been particularly shown and described with reference to a preferred embodiment thereof, it will be understood by those skilled in the art that various changes in form and details may be made therein without departing from the spirit and scope of the invention.

What is claimed is:

1. A machine for automatically and precisely stacking and laminating thin plates of fragile material such as glass to form a laminant such as used in a capacitor, the machine comprising:
   (a) a horizontal support table,
   (b) at least two holders on the support table for separate stacks of thin fragile plates to be precisely stacked in one stack,
   (c) a pick-up head above the support table, the pick-up head mounting a movable pick-up bar, a movable registration bar, and a sensor bar which is laterally stationary with the head movable into sensing position relative to the pick-up bar,
   (d) the support table and pick-up head being mounted for relative movement in a horizontal plane,
   (e) vacuum passages in the pick-up bar at a source of vacuum connected thereto for vacuum pick-up of the plates from the holders,
   (f) a pallet holder for pallets receiving and supporting a stack of plates deposited thereon by the pick-up bar,
   (g) and automatic pre-programmed drives and control circuit for controlling the relative movement of the slide head and table, the movement of the pick-up bar, registration bar and sensor bar.

2. A machine as in claim 1 wherein there are at least two pick-up heads, and a set of at least two holders for stacks of the fragile plates for each head, a pallet conveyor on the table moving past the two pick-up heads, and a pallet moving mechanism for moving a loaded pallet onto the conveyor.

3. A machine as in claim 2 wherein the conveyor is a belt conveyor and further including a pallet conveyor unloader comprising a pallet stop movable into the path of the conveyor and a pallet ejector laterally movable across the conveyor in front of the stop.

4. A machine as in claim 1 wherein the pick-up head is stationary and the table is horizontally movable in at least two directions perpendicular to one another under the control of the automatic preprogrammed drives and control circuit.

5. A machine as in claim 4 wherein the pick-up bar is vertically movable toward and away from the table from the pick-up head and the pick-up bar is laterally movable to a predetermined position determined by an alignment mark on a picked-up fragile plate.

6. A machine as in claim 5 wherein the registration bar is pivotally mounted from the pick-up head and movable to contact an edge of the bottom of the pick-up bar to align one flat edge of the fragile plate with the bottom edge of the pick-up bar.

7. A machine as in claim 6 wherein the sensor bar includes a photocell sensor and is pivotally mounted on the pick-up head to move into and out of a position to place the photocell sensor beneath the bottom of the pick-up bar to sense an alignment mark on a picked-up fragile plate during lateral movement of the pick-up bar.

8. A machine as in claim 1 further comprising a source of adhesive binder carried by the support table and positioned such that relative movement of the table and pick-up head will move the pick-up bar above the source of adhesive binder.

9. A machine as in claim 8 wherein the source of adhesive binder is an elongated vertically movable capillary pad of liquid adhesive supported by the table and movable upwardly therefrom to contact a fragile plate held on the bottom of the pick-up bar.

10. A machine as in claim 1 wherein the holders for the separate stacks of fragile plates are identical magazines each open at the top for movement of the pick-up bar therein from above.

11. A machine as in claim 10 wherein the automatic pre-programmed drives and control circuit includes a numerical control unit pre-programming the particular one of the magazines the pick-up bar picks up a plate from.

12. A machine as defined in claim 11 wherein there are three magazines, one for a left electrode on a fragile glass plate, one for a right electrode on a fragile glass plate, and the third for filler fragile glass plates, each electrode having a configuration to include an alignment mark, the electrodes being stacked to provide a body of an electrical capacitor.

13. A machine as in claim 1 further comprising electrical switches connected in the control circuit and positioned to operate on the limit of movement of the pick-up bar, registration bar and sensor bar.

14. A machine as defined in claim 1 wherein the vacuum passages in the pick-up bar include holding vacuum passages and vacuum sensing passages, vacuum sensing means connected to the vacuum sensing passages, and control means for controlling the application of vacuum to the passages, the control means operated by the control circuit.

15. A machine as defined in claim 14 further comprising a source of air pressure selectively connected to passages in the pick-up bar, and controls to apply air pressure to the pick-up bar when a defective fragile plate is sensed by vacuum on the bottom of the pick-up bar and to thereby blow off the plate from the pick-up bar bottom into a receptacle therefrom carried by the table.

16. A machine as in claim 1 further comprising a pallet unloader including a motor controlled by the control circuit for moving a pallet sliding member to slide the pallet from the pallet holder to an unload position when a stack of plates on the pallet is completed.

17. A machine as defined in claim 16 further comprising a pallet loading mechanism for loading an empty pallet into the pallet holder, the loading mechanism including a pallet inject motor connected to a pallet contacting member contacting a pallet in the storage position, the pallet inject motor controlled by the control circuit for sliding an empty pallet into the pallet holder when a loaded pallet has been removed therefrom.

18. A machine as defined in claim 17 further comprising a lock for a pallet in the pallet holder.

References Cited

FOREIGN PATENTS 593,212  10/1947  Great Britain.

SAMUEL FEINBERG, Primary Examiner

U.S. Cl. X.R.

270—58; 214—6; 156—356, 361